United States Patent
Lee et al.

(10) Patent No.: US 8,988,634 B2
(45) Date of Patent: Mar. 24, 2015

(54) OPTICAL FILM AND LIQUID CRYSTAL DISPLAY DEVICE COMPRISING THE SAME

(75) Inventors: Weonwoong Lee, Pyeongtaek-si (KR); Haechon Song, Pyeongtaek-si (KR)

(73) Assignee: LG Electronics Inc., Seoul (KR)

(*) Notice: Subject to any disclaimer, the term of this patent is extended or adjusted under 35 U.S.C. 154(b) by 545 days.

(21) Appl. No.: 13/272,055

(22) Filed: Oct. 12, 2011

(65) Prior Publication Data

US 2012/0281163 A1    Nov. 8, 2012

(30) Foreign Application Priority Data

May 3, 2011 (KR) .................. 10-2011-0042170
Jun. 7, 2011 (KR) .................. 10-2011-0054495

(51) Int. Cl.
G02F 1/1335 (2006.01)
G02B 5/02 (2006.01)
G02B 5/22 (2006.01)

(52) U.S. Cl.
CPC ............ G02B 5/0242 (2013.01); G02B 5/0278 (2013.01); G02B 5/223 (2013.01); G02F 1/133606 (2013.01)
USPC ............ 349/62; 359/599; 359/359; 428/212; 428/328

(58) Field of Classification Search
CPC .................................. G02F 1/133504
USPC .............. 349/62; 359/599, 359; 428/212, 328
See application file for complete search history.

(56) References Cited

U.S. PATENT DOCUMENTS

| | | | | |
|---|---|---|---|---|
| 5,118,352 A * | 6/1992 | Noguchi | ...... | 106/436 |
| 6,191,833 B1 * | 2/2001 | Hirakata | ...... | 349/61 |
| 6,300,249 B1 * | 10/2001 | Yoshida et al. | ...... | 438/693 |
| 6,730,727 B2 * | 5/2004 | Oshima et al. | ...... | 524/430 |
| 6,818,276 B2 | 11/2004 | Bourdelais et al. | | |
| 2002/0018887 A1* | 2/2002 | Sumida et al. | ...... | 428/331 |
| 2003/0104188 A1 | 6/2003 | Shoshi et al. | | |
| 2004/0202822 A1 | 10/2004 | Bourdelais et al. | | |
| 2005/0152038 A1 | 7/2005 | Nishida et al. | | |
| 2007/0195431 A1 | 8/2007 | Asakura et al. | | |
| 2009/0068484 A1 | 3/2009 | Toshima | | |
| 2011/0038139 A1 | 2/2011 | Chung et al. | | |

FOREIGN PATENT DOCUMENTS

| | | |
|---|---|---|
| CN | 1419137 A | 5/2003 |
| CN | 101881846 A | 11/2010 |
| EP | 0 884 360 A1 | 12/1998 |
| WO | WO 2010/120864 A1 | 10/2010 |

* cited by examiner

*Primary Examiner* — Lucy Chien
(74) *Attorney, Agent, or Firm* — Birch, Stewart, Kolasch & Birch, LLP

(57) ABSTRACT

An optical film is provided. According to an embodiment, the optical film may include a base material layer, a first layer disposed on the base material layer and having a first oxide and at least one bead, and a second layer disposed on the first layer and having a second oxide and a mineral pigment.

9 Claims, 5 Drawing Sheets

OPTICAL FILM AND LIQUID CRYSTAL DISPLAY DEVICE COMPRISING THE SAME

CROSS-REFERENCE TO RELATED APPLICATIONS

The present application claims priority under 35 U.S.C. §119 to Korean Patent Application No. 10-2011-0042170 filed May 3, 2011 and Korean Patent Application No. 10-2011-0054495 filed Jun. 7, 2011 in Republic of Korea. The entire contents of each of these applications are hereby incorporated by reference in their entirety.

BACKGROUND OF THE INVENTION

The present disclosure relates to an optical film and a liquid crystal display device including the same.

Recently, as various portable devices such as a mobile phone, a Personal Digital Assistant (PDA), and a notebook computer are developed, a need for a thin, light, and small flat panel display device applicable thereto has increased. For developing such a flat panel display device, researches are actively conducted on a Liquid Crystal Display (LCD), a Plasma Display Panel (PDP), a Field Emission Display (FED), a Vacuum Fluorescent Display (VFD), and the like. Particularly, an LCD is in the spotlight because of the advantages of mass producibility, simple driving means, high-definition, and large-sized screen.

An LCD is a transmissive display device, which adjusts the intensity of light which transmits through a liquid crystal layer using an anisotropic refractive index of liquid crystal particles to display an image on a screen. Therefore, a backlight may be installed in an LCD as a source of light which transmits through the liquid crystal layer to display an image. Generally, a backlight is roughly classified into two kinds.

The first kind is a side-light-type backlight which is installed on a side of a liquid crystal panel to provide light, and the second kind is a direct-light-type backlight which directly provides light under a liquid crystal panel.

The side-light-type backlight installed on a side of a liquid crystal display may provide light to a liquid crystal layer through a reflection plate and a light guide plate. Therefore, an LCD adopting the side-light-type backlight may be designed to be thin, and is typically used in an electronic device such as a notebook computer which needs a thin display device.

However, since a lamp of the side-light-type backlight which emits light is located on a side of a liquid crystal panel, it is difficult to apply the side-light-type backlight to a large-sized liquid crystal panel. Moreover, since light is supplied via the light guide plate, it is difficult to obtain high brightness. Therefore, the side-light-type backlight may not be suitable for use in a liquid crystal panel for a recently spotlighted large screen LCD TV.

Since the direct-light-type backlight supplies light directly to a liquid crystal layer, the direct-light-type backlight is more applicable to a large-sized liquid crystal panel and high brightness may be obtained. Therefore, the direct-light-type backlight is typically used for manufacturing a liquid crystal panel for an LCD TV.

Meanwhile, characteristics of light generated from a light source are changed while the light passes through various optical films before the light is supplied to a liquid crystal panel. Theses optical films may diffuse, reflect, and shield the light to improve light efficiency and process efficiency.

SUMMARY OF THE INVENTION

The embodiments of the present invention address these and other limitations associated with the related art optical films and liquid crystal displays.

In one embodiment of the present invention, an optical film includes a base material layer; a first layer disposed on the base material layer and including a first oxide and at least one bead; and a second layer disposed on the first layer and including a second oxide and a mineral pigment.

In another embodiment of the present invention, an optical film includes a base material layer INCLUDING a first side and a second side opposing each other; a support pattern disposed on the first side of the base material layer and including a plurality of support parts; and a light shielding pattern disposed on the second side of the base material layer and including a plurality of light shielding parts which includes an oxide, wherein the plurality of light shielding parts include a first light shielding part and a second light shielding part, at least one of the plurality of support parts is disposed on a region corresponding to a region between the first and second light shielding parts, and the support part comprises a support layer having an air gap therein.

In further another embodiment of the present invention, a liquid crystal display device includes a liquid crystal display panel; a light source disposed in the back of the liquid crystal display panel; an optical film disposed between the light source and the liquid crystal display panel, wherein the optical panel includes a base material layer; a first layer disposed on the base material layer and including a first oxide and a bead; and a second layer disposed on the first layer and including a second oxide and a mineral pigment.

In still further another embodiment of the present invention, a liquid crystal display device includes a liquid crystal display panel; a light source disposed in the back of the liquid crystal display panel; an optical film disposed between the light source and the liquid crystal display panel, wherein the optical film includes a base material layer including a first side and a second side opposing each other; a support pattern disposed on the first side of the base material layer and including a plurality of support parts; and a light shielding pattern disposed on the second side of the base material layer and including a plurality of light shielding parts which include an oxide, wherein the light shielding parts include a first light shielding part and a second light shielding part, and at least one of the plurality of support parts is disposed on a region corresponding to a region between the first and second light shielding parts.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
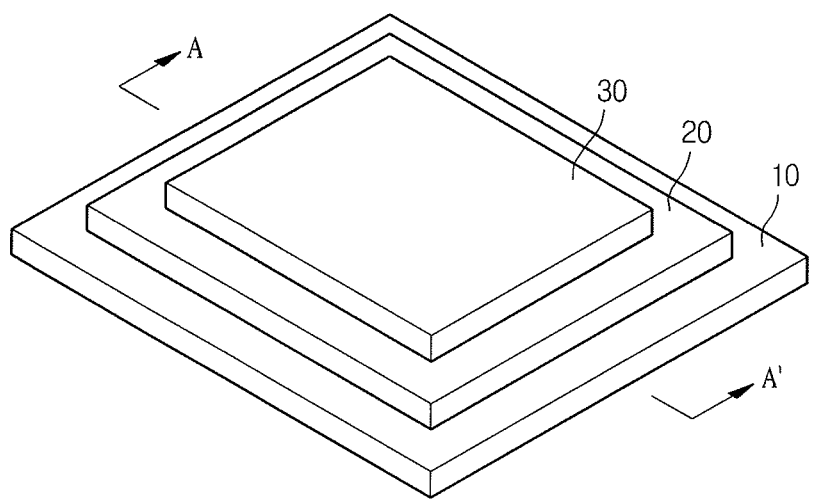
FIG. 1 is a perspective view illustrating an example of an optical film according to a first embodiment of the present invention.
Figure 2:
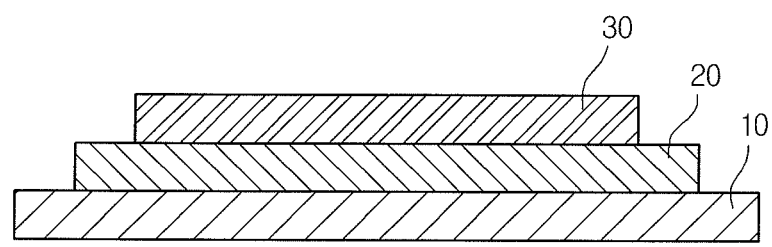
FIG. 2 is a cross-sectional view illustrating a cross section along a path A-A' of the optical film illustrated in FIG. 1.

Firstly, an optical film according to a first embodiment will be described in detail referring to FIGS. 1 and 2. FIG. 1 is a perspective view illustrating an example of the optical film according to the first embodiment. FIG. 2 is a cross-sectional view illustrating a cross section along a path A-A' of the optical film illustrated in FIG. 1.

Referring to FIGS. 1 and 2, an optical film 310 according to the first embodiment includes a base material layer 10, a first layer 20, and a second layer 30. The optical film 310 can used in various liquid crystal display devices and other types of devices where light diffusion is needed.

The base material layer 10 may support the first and second layers 20 and 30 formed thereon. The base material 10 may include light transmissive resin. For instance, the base material layer 10 may include thermoplastic such as polyethyleneterephthalate (PET) and polycarbonate (PC).

The base material layer 10 may further include other additives for maintaining mechanical properties and optical stability of the optical film. For instance, the base material layer 10 may include at least one of ultraviolet ray absorbent, infrared ray absorbent, antioxidant, heat stabilizer, selective wavelength absorbent, flame retardant, plasticizer, stabilizer, lubricant, colorant, fluorescent whitening agent, and antistatic agent.

The first layer 20 may be disposed on the base material 10. The first layer 20 may include a first oxide and one or more beads. The first oxide may include at least one of a titanium oxide and a silicon oxide. Preferably, the first oxide include both titanium oxide and silicon oxide.

The titanium oxide may act to absorb and shield light. For instance, the titanium oxide may increase brightness by preventing a leakage of light. However, an embodiment is not limited thereto, and may include various oxides capable of shielding light.

The titanium oxide content in the first layer 20 may be about, e.g., 15 wt % to about 25 wt %. When the titanium oxide content is more than about 15 wt %, improvement of brightness may be maximized. Also, when the titanium oxide content in the first layer 20 is less than about 25 wt %, color distortion due to inherent color of the titanium oxide may be prevented with improvement of brightness. Accordingly, a display device in which the optical film according to the present invention is formed is protected from displaying unintended color, and visibility degradation may also be prevented using the present invention.

A diameter or width of each particle of the titanium oxide in the first layer 20 may be about 0.3 µm to about 0.7 µm. When the diameter or width of each particle of the titanium oxide is larger than about 0.3 µm, the shielding function may be fulfilled reducing manufacturing cost. Also, when the diameter or width of each particle of the titanium oxide is smaller than about 0.7 µm, the shielding function may be maximized. Depending on the shape of the titanium oxide particles in the first layer 20, the diameter or width may be used. If the particle shape involves a circle or semicircle, then the diameter may be applicable, whereas if the particle shape involves a rectangle, square or other shape is used, the width may be applicable.

Meanwhile, the silicon oxide in the first layer 20 may act as a diffusion inducer which diffuses and induces light. Also, the silicon oxide may act to reflect light. That is, the silicon oxide may reflect light when the light deviates from a light path. Accordingly, a bright line of light may be prevented, and light may be induced to uniformly diffuse.

The silicon oxide content in the first layer 20 may be about 2 wt % to about 5 wt %. When the silicon oxide content in the first layer 20 is more than about 2 wt %, the light diffusing and inducing function may be maximized. Also, when the silicon oxide content is less than about 5 wt %, the light diffusing function may be fulfilled reducing manufacturing cost.

A diameter or width of each particle of the silicon oxide in the first layer 20 may be about 2 µm to about 5 µm. When a diameter or width of each particle of the silicon oxide is larger than about 2 µm, the light diffusing function may be fulfilled reducing manufacturing cost. Also, when the diameter or width of each particle of the silicon oxide is smaller than about 5 µm, the function as a diffusion inducer may be maximized. Depending on the shape of the silicon oxide particles in the first layer 20, the diameter or width may be used. If the particle shape involves a circle or semicircle, then the diameter may be applicable, whereas if the particle shape involves a rectangle, square or other shape is used, the width may be applicable.

The beads in the first layer 20 may include silicon beads. Like the silicon oxide, the silicon beads may act as a diffusion inducer which diffuses and induces light. Also, the silicon beads may act to reflect light. Accordingly, a bright line of light may be prevented as light may be induced to uniformly diffuse.

The bead content in the first layer 20 may be about 5 wt % to about 10 wt %. When the bead content in the first layer 20 is more than about 5 wt %, the light diffusing and inducing function may be maximized. When the bead content is less than about 10 wt %, the light diffusing function may be fulfilled reducing manufacturing cost.

A diameter or width of each of the beads (depending on the shape of the beads) may be about 3 µm to about 8 µm. When the diameter or width of each of the beads is larger than about 3 µm, the light diffusing function may be fulfilled reducing manufacturing cost. When the diameter or width of each of the beads is smaller than about 8 µm, the function as a diffusion inducer may be maximized.

The first layer 20 may further include at least one of a hardening agent and a solvent for hardening.

The first layer 20 may act to absorb light incident from a light source to shield light. Also, the first layer 20 may act as a diffusion inducer which diffuses and induces light. Also, the silicon oxide in the first layer 20 may act to reflect light. Accordingly, a bright line of light may be prevented. That is, light may be induced to uniformly diffuse.

The first layer 20 may be formed on the base material layer 10 through a printing process. For instance, the first layer 20 may be formed through various printing methods such as gravure off set, reverse off set, screen printing, and gravure printing.

To perform the gravure offset printing, an intaglio where a pattern is inscribed may be filled with a paste, and then, a first transfer may be performed using a silicon rubber called blanket and a second transfer may be performed by contacting the blanket with a substrate on which a conductive layer is formed.

To perform the reverse offset printing, a paste may be applied to a roll-type blanket, and this blanket may be contacted with a concave-convex cliché to form an intended pattern, and thereafter, the pattern formed on the blanket may be transferred to a conductive layer.

To perform the screen printing, a paste may be disposed onto a screen having a pattern, and then, the paste may be directly disposed onto a substrate on which a conducive layer is formed through an opened portion of the screen by rolling a squeegee.

To perform the gravure printing, a blanket inscribed with a pattern is wound around a roll, and a paste is filled into the pattern, and then is transferred to a substrate on which a conductive layer is formed.

In embodiments, the above-described methods may be independently or complexly used. Also, other printing methods widely known to those skilled in the art may be used.

As shown in FIGS. 1 and 2, the second layer 30 may be disposed on the first layer 20. The second layer 30 may include a second oxide and a mineral pigment. The second oxide may include a titanium oxide. The titanium oxide may act to absorb and shield light. However, an embodiment is not limited thereto, and may include various oxides capable of shielding light.

The titanium oxide content in the second layer 30 may be about 40 wt % to about 50 wt %. When the titanium oxide content in the second layer 30 is more than about 40 wt %, the light shielding function may be maximized. Also, when the titanium oxide content in the second layer 30 is less than about 50 wt %, color distortion due to inherent color of the titanium oxide may be prevented with improvement of brightness. Accordingly, a display device in which the present optical film is formed will not display unintended color, and visibility degradation may also be prevented.

A diameter or width of each particle of the titanium oxide in the second layer 30 may be about 0.3 µm to about 0.7 µm. For instance, a diameter or width of each particle of the titanium oxide in the second layer 30 may be about 0.5 µm. When the diameter or width of each particle of the titanium oxide in the second layer 30 is larger than about 0.3 µm, the shielding function may be fulfilled reducing manufacturing cost. Also, when the diameter or width of each particle of the titanium oxide in the second layer 30 is smaller than about 0.7 µm, the shielding function may be maximized. Depending on the shape of the titanium oxide particles in the second layer 30, the diameter or width may be used. If the particle shape involves a circle or semicircle, then the diameter may be applicable, whereas if the particle shape involves a rectangle, square or other shape is used, the width may be applicable.

Meanwhile, the mineral pigment in the second layer 30 may compensate color generated due to the oxide. The mineral pigment may have inherent color of the oxide and complementary color. Accordingly, the inherent color of the oxide may be prevented from developing. For instance, the titanium oxide of the second layer 30 may be tinged with yellow which is the inherent color thereof, and thus, a yellowing phenomenon may occur. In the embodiments, a blue pigment may be included in the second layer 30 to prevent the yellowing phenomenon.

The mineral pigment content in the second layer 30 may be about 0.1 wt % to about 0.8 wt %. When the mineral pigment content in the second layer 30 is more than about 0.1 wt %, the color compensation function may be maximized. Also, when the mineral pigment content in the second layer 30 is less than about 0.8 wt %, the color compensation function may be fulfilled preventing development of inherent color of the mineral pigment.

A diameter or width of each particle of the mineral pigment in the second layer 30 (depending on the shape of the mineral pigment particles) may be about 0.3 µm to about 0.8 µm. When the diameter or width of each particle of the mineral pigment content in the second layer 30 is larger than about 0.3 µm, the color compensation function may be maximized. Also, when the diameter or width of each particle of the mineral pigment content in the second layer 30 is smaller than about 0.8 µm, the mineral pigment may be prevented from developing its own color.

The second layer 30 may further include at least one of a hardening agent and a solvent for hardening. In a preferred embodiment, the second layer 30 does not have any holes therein.

The second layer 30 may act to absorb light to shield light. Also, the second layer 30 may compensate color due to an oxide to prevent color distortion. Accordingly, inherent color for display may be realized, and visibility may be improved.

An area of the second layer 30 may be about in size 10% to about 95% of that of the first layer 20. Preferably, the area of the second layer 30 may equal to about 60% to 95% of the area of the first layer 20. That is, the size of the entire area of the second layer 30 may equal to about 60% to 95% of the size of the entire area of the first layer 20. When the area of the second layer 30 is larger than about 10% of that of the first layer 20, the shielding function may be maximized. Also, when the area of the second layer 30 is smaller than about 95% of that of the first layer 20, it may be prevented that color of the optical film is darkened causing visibility degradation.

Referring to FIG. 1, the second layer 30 may form one area in comparison with a typical light shielding layer composed of a plurality of patterns. Accordingly, printability of the second layer 30 may be improved, and process efficiency may be increased. Also, when the optical film is formed using the present optical film in a liquid crystal display device later, the time taken by a process of aligning a light source and the optical film may be reduced, and the aligning process may be more easily performed.

According to a related art, the second layer in an optical film acting as a light shielding layer is composed of a plurality of patterns, and thus, it takes a long time to align the second layer and a light source. Also, according to a related art, a fraction defective is high due to failure of the aligning process.

Meanwhile, the second layer 30 of the present invention may be formed on the first layer 20 through a printing process. The second layer 30 may be formed using the above-described method and thus the assembling time for the liquid crystal display having the optical film of the present invention is reduced.

Hereinafter, an optical film according to a second embodiment of the present invention will be described in detail referring to FIGS. 3 to 6. For clarity and conciseness, detailed descriptions which are the same as or similar to the above descriptions are omitted, and differences are described in detail.

Figure 3:
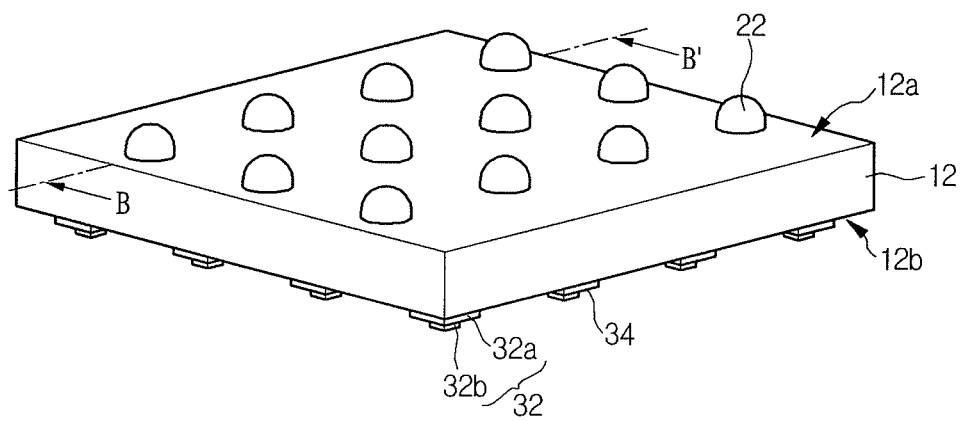
FIG. 3 is a perspective view illustrating an example of an optical film according to a second embodiment of the present invention.
Figure 4:
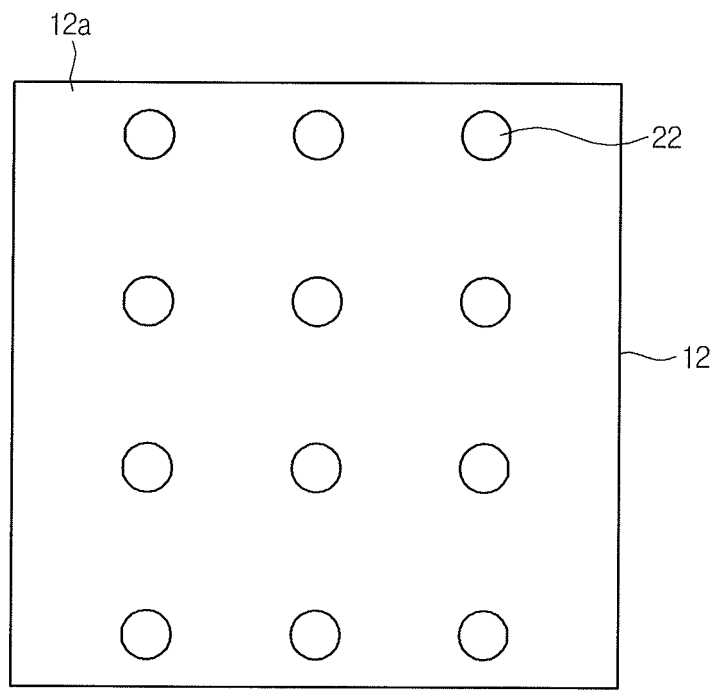
FIG. 4 is a front view illustrating a first side of the optical film illustrated in FIG. 3 according to the second embodiment.
Figure 5:
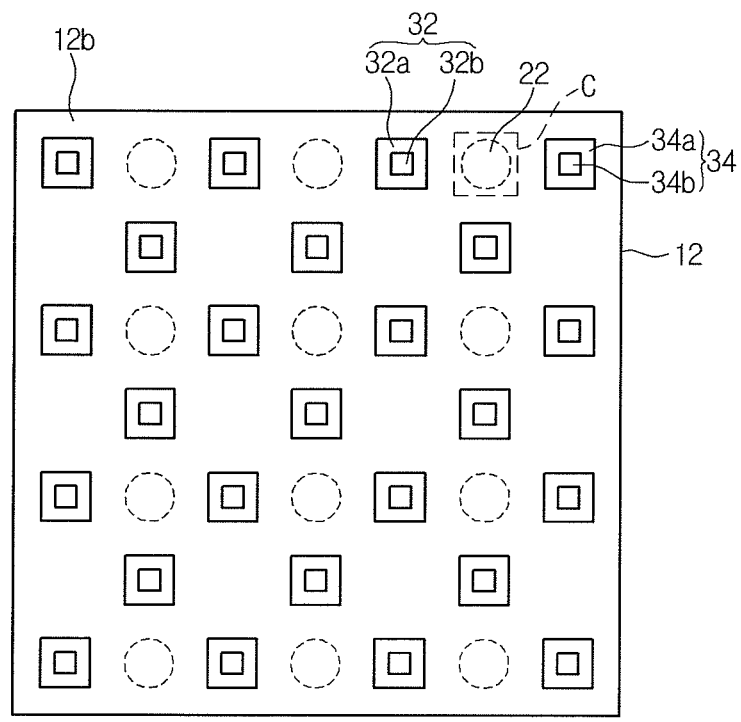
FIG. 5 is a front view illustrating a second side of the optical film illustrated in FIG. 3 according to the second embodiment.
Figure 6:
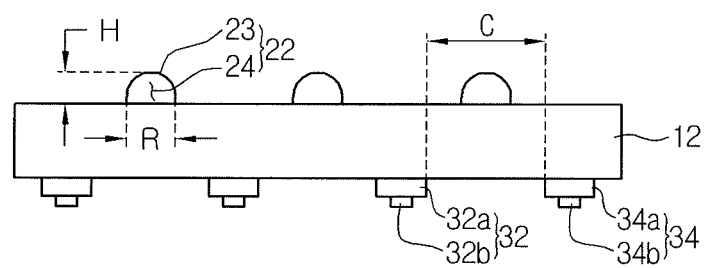
FIG. 6 is a cross-sectional view illustrating a cross section along a path B-B' of the optical film illustrated in FIG. 3.

FIG. 3 is a perspective view illustrating an optical film according to the second embodiment. FIG. 4 is a front view illustrating a first side of the optical film of FIG. 3 according to the second embodiment. FIG. 5 is a front view illustrating a second side of the optical film of FIG. 3 according to the second embodiment. FIG. 6 is a cross-sectional view illustrating a cross section along a path B-B' of the optical film illustrated in FIG. 3.

Referring to FIGS. 3 to 6, an optical film 312 according to the second embodiment includes a base material layer 12, a support pattern, and a light shielding pattern.

The base material layer 12 may include a first side 12a and a second side 12b opposing the first side 12a. The base material layer 12 may support the support pattern and the light shielding pattern formed thereon. The base material 12 may include light transmissive resin. For instance, the base material layer 12 may include thermoplastic such as PET and PC.

As shown in FIG. 4, the support pattern of the optical film 312 may be disposed on the first side 12a of the base material layer 12. The support pattern may include a plurality of support parts 22. Each support part 22 may have a form of a protrusion. For instance, the support part 22 may have a form of a hemispherical protrusion, a bump, etc. For example, the support part 22 may have a lenticular form.

Each support part 22 may include a support layer 23 and an air gap/space 24 filled under the support layer 23. For instance, the support layer 23 may be a hollow cover/shell, and the air may fill the hollow/inside area of the support layer 23 (which is referred to herein as the air gap 24). A height H of the air gap 24 may be about 1.0 mm to about 2.0 mm. The air gap 24 may act as a light diffusion layer. The support layer 23 may surround and houses the air gap 24. The support layer 23 may support the air gap 24. The support layer 23 may include Ultra Violet (UV) ink.

Referring to FIG. 6, a height H of each support part 22 may be about 1.0 mm to about 2.0 mm. When the height H of the support part 22 is larger than about 1 mm, a height of the air gap 24 of the support part 22 may be increased so that another base material disposed on the optical film may be supported. When the height H of the support part 22 is smaller than about 2.0 mm, an amount of the UV ink included in the support part 22 may be reduced, and thus manufacturing cost may also be reduced.

A diameter (or width) R of each support part 22 may be about 1 mm to about 30 mm. For instance, the diameter or width R of the support part 22 may be about 10 mm to about 15 mm. When the diameter or width R of the support part 22 is larger than about 1 mm, the air gap 24 included in the support part 22 may become larger so that another base material disposed on the optical film may be supported. When the diameter or width R of the support part 22 is smaller than about 30 mm, the support pattern may be invisible supporting the other base material. Also, an amount of the UV ink included in the support part 22 may be reduced, and thus manufacturing cost may also be reduced. Each support part 22 can be in a shape of a dot, protrusion, bump, circle, semicircle, rectangle, square, etc. If the screen printing method is used to form the support parts 22, preferably the support parts 22 in the shape of hemispherical protrusions may be formed.

The plurality of support parts 22 may have the same thickness and diameter/width, and/or the same shape and/or size as one another, or can have different shape, size, dimensions, etc. Also, the plurality of support parts 22 may be arranged with distances corresponding to each other. For instance, the support parts 22 may be separated from each other by a uniform distance. The support parts 22 may mechanically keep base materials on the optical film flat for the base materials not to be bent. The support part 22 includes UV ink.

The UV ink here may photochemically react with ultraviolet rays to be hardened from liquid to solid in a fraction of a second. The UV ink is being widely used because it is instantly dried, is produced at a low temperature and high speed, and is free from pollution. The UV ink has strong rub resistance, heat resistance, solvent resistance, and chemical resistance, and is free from set-off and blocking.

The UV ink according to the embodiment may include at least one of oligomer, monomer, adhesion promoter, initiator, and additive. The oligomer may include polyester acrylate, epoxy acrylate, and urethane acrylate. For instance, urethane acrylate may be used for the oligomer. The urethane acrylate has excellent hardening properties, and is hardened even though oxygen concentration is high. Also, a strong film of paint may be obtained.

The oligomer content in the support part(s) 22 may be about 65 wt % to about 90 wt %. When the oligomer content is more than about 65 wt %, viscosity may be sufficiently high, and corrosion resistance and hardness may be improved. When the oligomer content is less than about 90 wt %, hardness may be improved maintaining adhering strength with a base material surface on which the UV ink is formed.

Meanwhile, the monomer may include acrylate monomer. The monomer may act as a reactive diluent which adjust viscosity of ink, and has hardening properties and adhesive properties. The monomer content in the support part(s) 22 may be about 5 wt % to about 15 wt %. When the monomer content is more than about 5 wt %, hardening properties and adhesive properties may be improved. When the monomer content is less than about 15 wt %, viscosity of the UV ink may be increased.

The adhesion promoter may act to reinforce adhering strength with a material, and reinforce strength of a UV ink composition through chemical action to a binder and a structural material.

The adhesion promoter content in the support part(s) 22 may be about 1 wt % to about 5 wt %. When the adhesion promoter content is more than about 1 wt %, adhering strength between the UV ink and the base material surface on which the UV ink is formed may be improved. Also, when the adhesion promoter content is less than about 5 wt %, the adhering strength may be improved without degrading properties of other compositions included in the UV ink.

The initiator may generate radical from ultraviolet rays, and may react with the oligomer or the monomer to cause polymerization. The initiator may include a carbonyl compound, a sulfur compound, and an azo compound.

The initiator content in the support part(s) 22 may be about 1 wt % to about 10 wt %. When the initiator content may be more than about 1 wt %, hardening time may be shortened. When the initiator content is less than about 10 wt %, polymerization may be well induced without dissolving other compositions.

The additive may include a polymerization inhibitor and an adjuvant. The adjuvant may include a stabilizer, a dispersant, etc, and may act as a sheath enhancer. The polymerization inhibitor may improve conservativeness of UV ink.

The additive content in the support part(s) 22 may be about 1 wt % to about 5 wt %. When the additive content is more than about 1 wt %, conservativeness and dispersibility of UV ink may be secured. When the additive content is less than about 5 wt %, stability and dispersibility may be improved without degrading properties of other compositions.

The UV ink according to the embodiment has high viscosity and strong cohesiveness. Therefore, when screen printing is performed using the UV ink, a transparent hemispherical protrusion may be performed. Also, a plurality of hemispherical protrusions formed from the UV ink may be uniform.

A mixing ratio of the above-described composition may vary with a size or hardness of a hemispherical protrusion, quality of material to which printing is performed, or condition of printing.

The support parts 22 may be formed by printing the UV ink. Particularly, the support parts 22 may be formed through a thick film screen printing. To perform the screen printing, a paste may be disposed onto a screen having a pattern, and then, the paste may be directly disposed onto a substrate on which a conducive layer is formed through an opened portion of the screen by rolling a squeegee.

The UV ink may be discretely printed with a predetermined distance, and a diameter or width of each printed UV ink or a distance between printed UV ink may be changed.

Particularly, the thick film screen printing is a special printing technique which increases a thickness of an image to be printed. That is, a thickness of layer is increased to a certain thickness by coating an emulsion several times, and then, a printing frame for screen is manufactured. In the completed printing frame for screen, all regions except for a region on which UV ink is printed, i.e., all regions except for via holes, are closed.

Next, when printing is performed using the manufactured printing frame and the screen printing method, UV ink is printed on a surface of material to be printed through the via holes of the printing frame. That is, transparent hemispherical protrusions are generated. Herein, the hemispherical protrusions generated on the surface of material to be printed are liquid. Therefore, the material on which the hemispherical protrusions are formed is passed through a UV dryer and exposed to UV rays to be instantly dried, and thus solid support parts 22 can be formed.

Meanwhile, the light shielding pattern may be disposed on the second side 12b of the base material layer 12. The light shielding pattern may include a plurality of light shielding parts 32 and 34 as shown in FIGS. 5 and 6.

The light shielding parts 32 and 34 may include first layers 32a and 34a and second layers 32b and 34b. The first layers 32a and 34a may act to absorb light to shield light. Each of the first layers 32a and 34a may include at least one of a titanium oxide and a silicon oxide. Preferably, each of the first layers 32a and 34a includes both titanium oxide and silicon oxide. The plurality of the first layers 32a and 34 are formed on the second side 12b of the base material layer 12 of the optical film 312.

The plurality of second layers 32b and 34b are respectively formed on the plurality of first layers 32a and 34b, and may act as a diffusion inducer which diffuses and induces light. Also, the second layers 32b and 34b may act to reflect light. Accordingly, a bright line of light may be prevented. That is, light may be induced to uniformly diffuse. The second layers 32b and 34b may include a titanium oxide.

When the optical film 312 is formed in a liquid crystal display device, the light shielding parts 32 and 34 are preferably disposed or positioned to correspond to a light source. For instance, light emitting units of a backlight unit disposed in a liquid crystal display device are positioned to correspond with or to be substantially aligned with the light shielding parts 32, 34 of the optical film 312 disposed above the backlight unit.

Referring to FIG. 5, the plurality of light shielding parts include the first light shielding part 32 and the second light shielding part 34. At least one support part 22 among the plurality of support parts 22 may be disposed on a region C between the first light shielding part 32 and the second light shielding part 34. For instance, the support part 22 may be disposed to correspond to a region between the light shielding parts 32 and 34. For example, as shown in FIG. 6, the support part 22 may be disposed on the first side 12a of the base material layer 22 and in the region C between the first and second light shielding parts 32 and 34 disposed on the second side 12b of the base material layer 12. As such, the support part 22 and the light shielding parts 32 and 34 may be alternately arranged.

Figure 7:
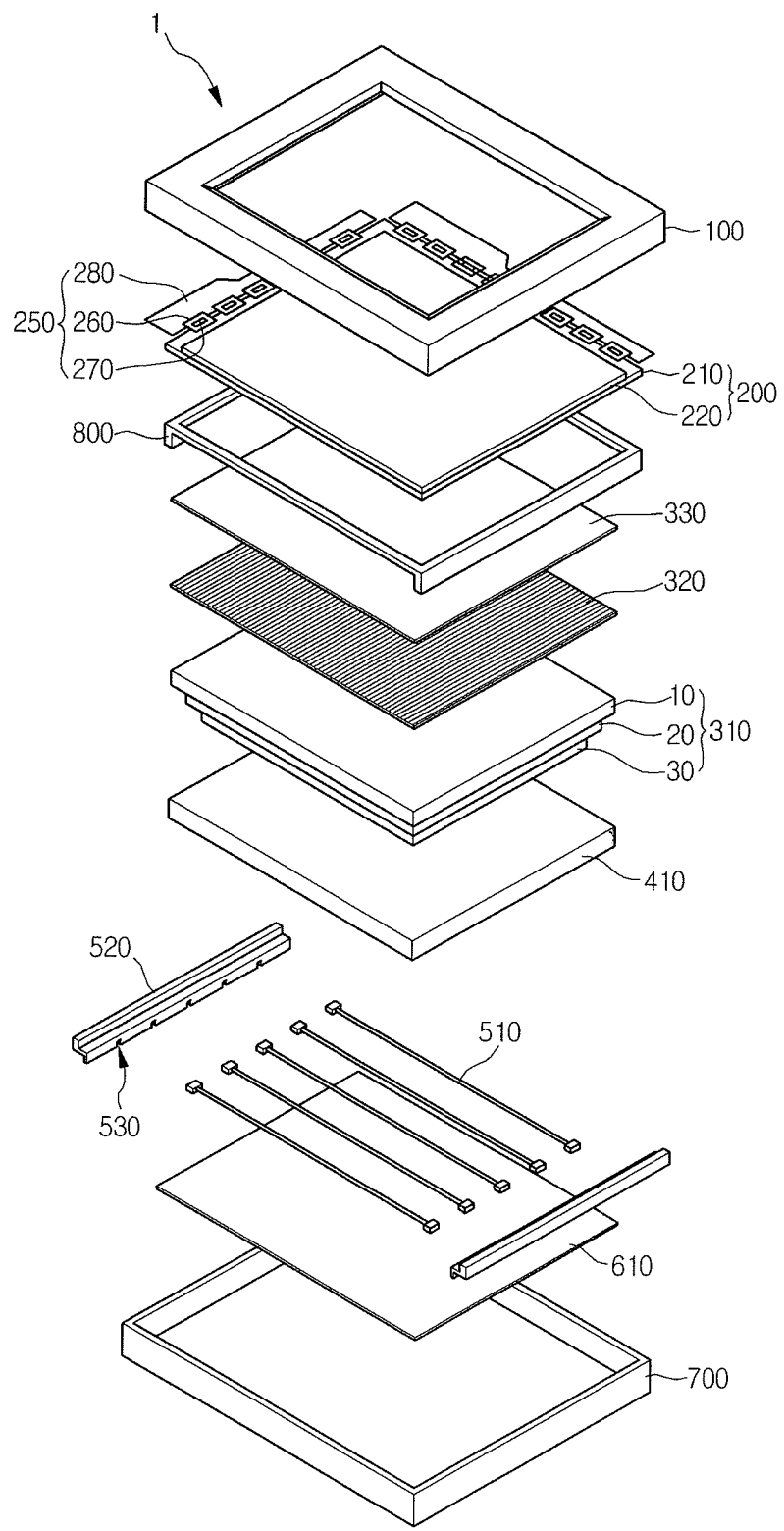
FIG. 7 is an exploded perspective view illustrating a liquid crystal display device including the optical film of FIGS. 1-2 according to the first embodiment.

Hereinafter, an example of a liquid crystal display device having the optical film 310 of FIGS. 1 and 2 according to the first embodiment will be described in detail referring to FIG. 7. FIG. 7 is an exploded perspective view illustrating the liquid crystal display device according to the first embodiment. The display device of FIG. 7 is merely an example and the optical film 310 can be used in any display device or other suitable device.

Referring to FIG. 7, a liquid crystal display device 1 according to the first embodiment includes an upper cover 100, a liquid crystal display panel 200, a panel support part 800, a protective film 330, a prism film 320, the optical film 310, an optical plate 410, a light source 510, a side mold 520, a reflective plate 610, and a lower cover 700. All the components of the display device are operatively coupled and configured.

The liquid crystal display panel 200 may be housed between the upper cover 100 and the lower cover 700. The liquid crystal display panel 200 may be supported by the panel support part 800.

The liquid crystal display panel 200 includes a first substrate 210 on which thin film transistors are formed and a second substrate 220 facing the first substrate 210. A liquid crystal layer may be disposed between the first and second substrates 210 and 220. The liquid crystal display panel 200 adjusts a liquid crystal arrangement of the liquid crystal layer to display an image. However, the liquid crystal display panel 200 is a non-light emitting device, and thus is supplied with light from the light source 510 disposed on the back.

A driving unit 250 is provided on one side of the first substrate 210 to apply driving signals. The driving unit 250 includes a Flexible Printed Circuit Board (FPCB) 260, a driving chip 270 installed on the FPCB 260, and a Printed Circuit Board (PCB) 280 connected to the other side of the FPCB 260. The driving unit 250 illustrated in FIG. 7 is formed using Chip On Film (COF) method; however, publicly known other methods such as Tape Carrier Package (TCP) and Chip On Glass (COG) may also be used. Also, the driving unit 250 may be directly mounted on the first substrate 210.

The protective film 330, the prism film 320, and the optical film 310 may be formed on the back of the liquid crystal display panel 200. Some of these layers may be replaced or substituted by other means. The protective film 330 uppermost positioned may protect the prism film 320 vulnerable to a scratch.

Trigonal prisms may be formed with a certain arrangement on the prism film 320. The prism film 320 acts to collect light diffused from the optical film 310 in a vertical direction to a flat surface of the liquid crystal display panel 200. Two sheets of the prism film 320 are preferably used, and a micro-prism formed on each prism film 320 is at a predetermined angle. Light which has passed through the prism film 320 mostly progresses in a vertical direction so that uniform distribution of brightness is provided.

The optical film 310 includes the base material layer 10, the first layer 20, and the second layer 30. For the optical film 310, the above-described optical film 310 of FIGS. 1 and 2 according to the first embodiment is adopted.

The optical film 310 may diffuse light incident through the optical plate 410, and prevent a bright line due to the light source 510. As described above, the optical film 310 has excellent performance of light diffusion and bright line prevention. Therefore, quality and characteristics of the liquid crystal display device 1 may be improved by including the optical film 310. Also, process efficiency and production yield may be increased.

The second layer 30, the first layer 20, and the base material layer 10 may be sequentially arranged along a progressing direction of light emitted from the light source 510. However, the embodiment is not limited thereto. Thus, reversely, the base material layer 10, the first layer 20, and the third layer 30 may be sequentially arranged along a progressing direction of light emitted from the light source 510.

The optical plate 410 may be composed of PET or PC. The optical plate 410 may perform a diffusion function. A thickness of the optical plate 410 may be about 1 mm to about 5 mm. Since the optical plate 410 has a relatively high strength, a distance between the optical plate 410 and the reflective plate 610 may be kept relatively constant. Although not illustrated, a supporter may be further included to maintain a distance between the optical plate 410 and the reflective plate 610.

The light sources 510 are preferably lamps but can be other light units, and are arranged in parallel with each other. The light sources 510 are disposed over the back of the liquid crystal display panel 200, and both ends of each light source 510 are housed in the side mold 520. The side mold 520 has a housing groove 530 for housing the light source 510. The light source 510 may include a Cold Cathode Fluorescent Lamp (CCFL) or an External Electrode Fluorescent Lamp (EEFL).

A pair of the side molds 520 is disposed along both ends of the liquid crystal panel 200 facing each other. The side mold 520 may also support the optical plate 410.

The reflective plate 610 is disposed under the light source 510, and re-reflects light which proceeds downwards to supply the light to the optical plate 410. The reflective plate 610 may be composed of plastic material such as PET or PC.

Accordingly, since the liquid crystal display device 1 of FIG. 7 includes the optical film 310 of FIGS. 1 and 2, all the advantages associated with the optical film 310 as discussed above are provided to the liquid crystal display device 1.

Figure 8:
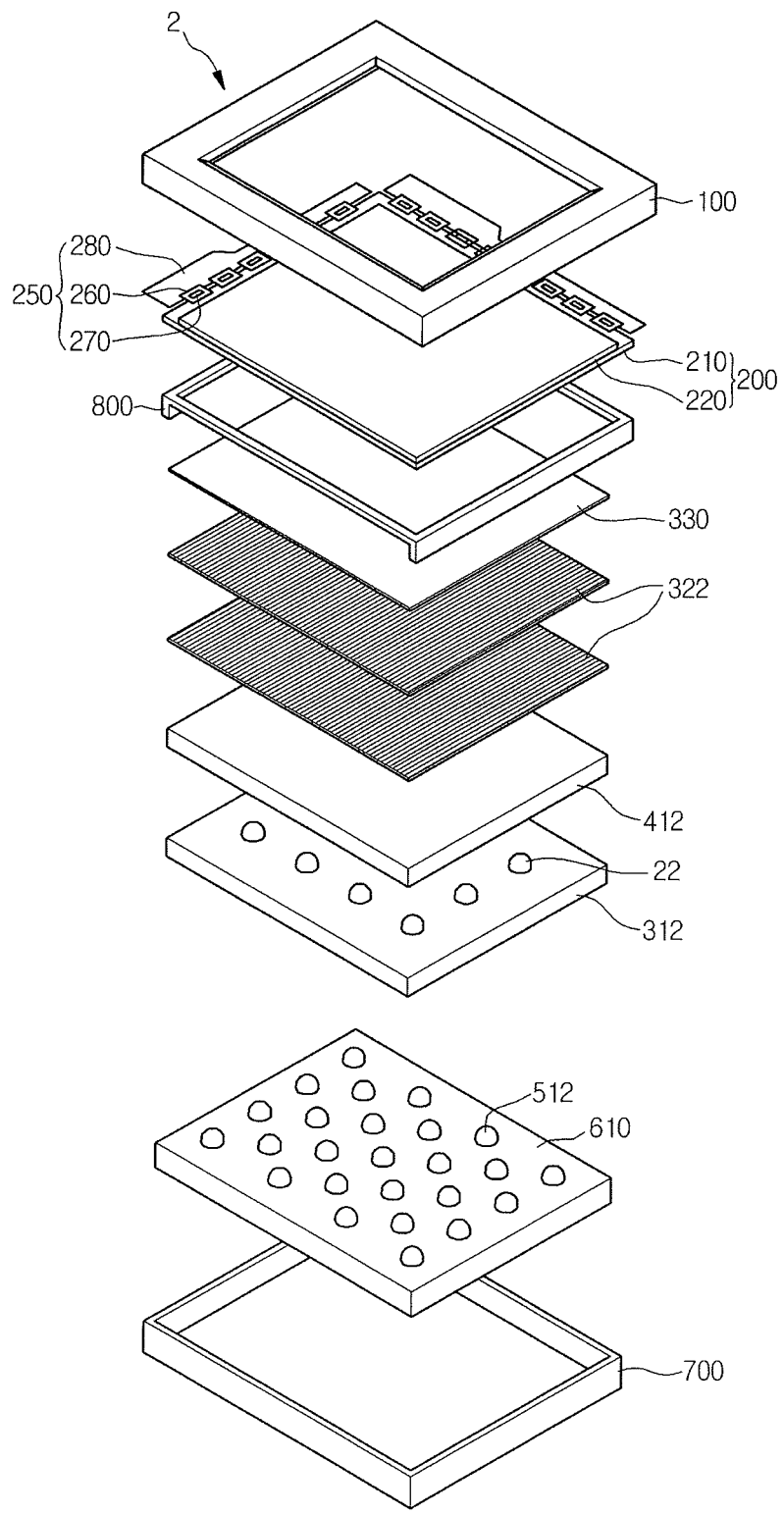
FIG. 8 is an exploded perspective view illustrating a liquid crystal display device including the optical film of FIGS. 3-6 according to the second embodiment.

Hereinafter, an example of a liquid crystal display device including the optical film 312 of FIGS. 3-6 according to the second embodiment will be described in detail referring to FIG. 8. FIG. 8 is an exploded perspective view illustrating the liquid crystal display device according to the second embodiment. The display device of FIG. 8 is merely an example and the optical film 312 can be used in any display device or other suitable device. For clarity and conciseness, detailed descriptions which are the same as or similar to the above descriptions are omitted, and differences are described in detail.

Referring to FIG. 8, a liquid crystal display device 2 according to the second embodiment includes an upper cover 100, a liquid crystal display panel 200, a panel support part 800, a protective film 330, a prism film 322, a diffusion plate 412, the optical film 312, a light source 512, a reflective plate 610, and a lower cover 700. The light source 512 can refer to multiple light sources 512 such as light emitting diodes (LEDs). All the components of the liquid crystal display device 2 are operatively coupled and configured.

The protective film 330, the prism film 322, the diffusion plate 412, and the optical film 312 may be formed on the back of the liquid crystal display panel 200. Two or more sheets of the prism film 322 may be used.

The diffusion plate 412 may uniformly diffuse light which has passed through the optical film 312. For instance, because the amount of light which passes through the optical film 312 may not be uniform, the diffusion plate 412 may act to maximize diffusivity and uniformity of the light. Through this, uniformity of image quality may be improved. Two or more sheets of the diffusion plate 412 may be used; however, only one sheet of the diffusion plate 412 may be used for the liquid crystal display device 2 according to the second embodiment. For example, uniformity of image quality may be sufficiently improved using only one sheet of the diffusion plate 412. This is because the support pattern included in the optical film 312 described below acts as a light diffusion layer.

The optical film 312 may include the base material layer 12, the support pattern, and the light shielding pattern. For the optical film 312, the above-described optical film 312 of FIGS. 3-6 according to the second embodiment is adopted.

The light shielding pattern of the optical film 312 includes the plurality of light shielding parts (32, 34 in FIG. 3). The light shielding parts 32 and 34 may be disposed on regions corresponding to the light source 512 such as LEDs. While light may be relatively strong in a region just above the light source 512, light may be relatively weak in a region between the light sources 512. That is, due to the location of the light source 512 such as the LEDs, the brightness of light from the LEDs may not be uniformly distributed toward the display panel 200, and a bright part and a dark part may exist. Therefore, preferably each light shielding part 32 is disposed over or above the light source 512 to mitigate the different brightness of light by absorbing and shielding light. As such, uniformity of light may be improved as the light propagates through the device 2.

As mentioned above, the support pattern of the optical film 312 includes the plurality of support parts (22 of FIG. 3). Each support part 22 may be disposed on a region corresponding to an area between two or more adjacent light shielding parts 32, 34. For instance, each support part 22 may be disposed on a region corresponding to an area between the light sources 512 so that the light from the light sources 512 may be more uniformly distributed and projected toward the panel 20. On the other hand, if the support part 22 were to be disposed just over the light source 512, the support part 22 may change a path of light, a shape of the support part 22 may be seen, and thus the support pattern may be seen degrading visibility. As such, the present invention preferably provides the support parts 22 on regions that correspond to (or are substantially aligned with) regions between the light sources 512.

The support parts 22 may keep base materials on the optical film 312 flat so that the base materials are not mechanically bent. Therefore, the more the support parts 22 are provided, it would be more advantageous. Also, in one example, the number of the supports parts 22 may be equal to that of the light sources 512. In another example, the number of light shielding parts 32, 34 may be equal to the number of the light sources 512 such as the number of LEDs.

The light shielding pattern, the base material layer 12, and the support pattern of the optical film 312 may be sequentially arranged along a proceeding direction of light emitted from the light source 512.

The light sources 512 may be arranged over the back of the liquid crystal display panel 200. The light source 512 may include the plurality of Light Emitting Diodes (LEDs).

Although not illustrated in the drawings, the liquid crystal display device 2 may further include a Dual Brightness Enhanced Film (DBEF). The DBEF may pass light polarized in a particular direction, and reflect light polarized in a direction vertical to the particular direction. The reflected light is changed to a polarization state through an optical material such as a scatter or a retarder to pass through the DBEF.

Therefore, a ratio of light used for display among non-polarized light, i.e., light use efficiency, may be increased.

Accordingly, since the liquid crystal display device 2 of FIG. 8 includes the optical film 312 of FIGS. 3 to 6, all the advantages associated with the optical film 312 as discussed above are provided to the liquid crystal display device 2.

For instance, according to the liquid crystal display device 2 according to the second embodiment, particularly when an LED is used as a light source, a hot spot phenomenon caused by non-uniform light may be prevented. Also, a partial stain may be prevented, and uniformity of light irradiated form a light source may be secured. Accordingly, uniformity of brightness and image quality for the display device 2 is improved. Also, since only one sheet of the diffusion plate 412 may be used, manufacturing cost may be reduced, and production yield may be improved.

Herein, the hot spot phenomenon generally refers to a situation where light emitting parts are relatively brighter than other parts due to the characteristics of point light emitting sources when a light source is an LED. This phenomenon degrades the display quality and brightness uniformity when a light source is required to provide the uniform surface light. The present invention eliminates or minimizes the hot spot phenomenon.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An optical film, comprising:
a base material layer;
a first layer disposed on the base material layer and comprising a first oxide and at least one bead; and
a second layer disposed on the first layer and comprising a second oxide and a mineral pigment,
wherein an area size of the second layer is about 60% to about 95% of an area size of the first layer.

2. The optical film of claim 1, wherein the first oxide comprises at least one material selected from a group consisting of a titanium oxide and a silicon oxide, and
wherein a content of the titanium oxide is about 15 wt % to about 25 wt %, or a diameter or width of each particle of the titanium oxide is about 0.3 µm to about 0.7 µm.

3. The optical film of claim 2, wherein a content of the silicon oxide is about 2 wt % to about 5 wt %, or a diameter or width of each particle of the silicon oxide is about 2 µm to about 5 µm.

4. The optical film of claim 1, wherein the at least one bead comprises a plurality of silicon beads, and
wherein a content of each of the silicon beads is about 5 wt % to about 10 wt %, or a diameter or width of each of the silicon beads is about 3 µm to about 8 µm.

5. The optical film of claim 1, wherein the second oxide comprises a titanium oxide, and
wherein a content of the second oxide is about 40 wt % to about 50 wt %, or a diameter or width of each particle of the second oxide is about 0.3 µm to 0.7 µm.

6. The optical film of claim 1, wherein the mineral pigment comprises a blue pigment, and
wherein a content of the mineral pigment is about 0.1 wt % to about 0.8 wt %, or a diameter or width of each particle of the mineral pigment is about 0.3 µm to about 0.8 µm.

7. The optical film of claim 1, wherein the second layer is without any holes.

8. A liquid crystal display device, comprising:
a liquid crystal display panel;
a light source disposed on a back side of the liquid crystal display panel; and
an optical film disposed between the light source and the liquid crystal display panel,
wherein the optical panel comprises at least one optical film, the at least one optical film including:
a base material layer,
a first layer disposed on the base material layer and comprising a first oxide and at least one bead, and
a second layer disposed on the first layer and comprising a second oxide and a mineral pigment,
wherein an area size of the second layer is about 60% to about 95% of an area size of the first layer.

9. The liquid crystal display device of claim 8, wherein the second layer, the first layer, and the base material layer are sequentially arranged along a proceeding direction of light emitted from the light source.

* * * * *